Sept. 12, 1933.                    H. NEHLS                    1,926,210
                              ELECTRICITY METER
                    Filed Sept. 24, 1929          2 Sheets-Sheet 1

Sept. 12, 1933.    H. NEHLS    1,926,210

ELECTRICITY METER

Filed Sept. 24, 1929    2 Sheets-Sheet 2

INVENTOR
Herbert Nehls
BY
John D. Morgan
ATTORNEY

Patented Sept. 12, 1933

1,926,210

UNITED STATES PATENT OFFICE 1,926,210

ELECTRICITY METER

Herbert Nehls, Hawthorne, N. J., assignor to Landis & Gyr, A-G., a joint-stock company of Switzerland Application September 24, 1929
Serial No. 394,833

2 Claims. (Cl. 247—2)

The invention relates to improvements in the structure of electricity meters, and more particularly to new and useful improvements in terminal chambers and cooperating or attachable current controlling or limiting devices.

Objects and advantages of the invention will be set forth in part hereinafter and in part will be obvious herefrom, or may be learned by practice with the invention, the same being realized and attained by means of the instrumentalities and combinations pointed out in the appended claims.

The invention consists in the novel parts, construction, arrangements, combinations and improvements herein shown and described.

The accompanying drawings, referred to herein and constituting a part hereof, illustrate one embodiment of the invention, and together with the description, serve to explain the principles of the invention.

Of the drawings:—

The invention is directed to providing in connection with electricity meters and the terminal chamber or devices thereof, a novel and useful block or attachment carrying a power line cut-out switch, or a current limiting device, or preferably both, which current controlling block is attachable to the terminals of the terminal block or chamber of practically all existing meters, and then may be sealed in position.

By my invention as embodied, I provide a block or carrier, having the desired current-controlling devices mounted therein, and terminals connectible to the leads or connections from the power line and having also circuit connections corresponding to the existing standard or other meter terminal connections. Mounted on this carrier, as embodied, is a power circuit cut-out switch and also a current limiting device, such as a fuse plug, the carrier on one side having terminals spaced or spaceable to connect to the terminals of the meter circuit wires, and to interlock with the meter terminal structure, and having circuit connections also for the power and load circuit wires, without any structural changes in present standard types of meters. Means for sealing the device in operative position are also provided.

Figure 1:
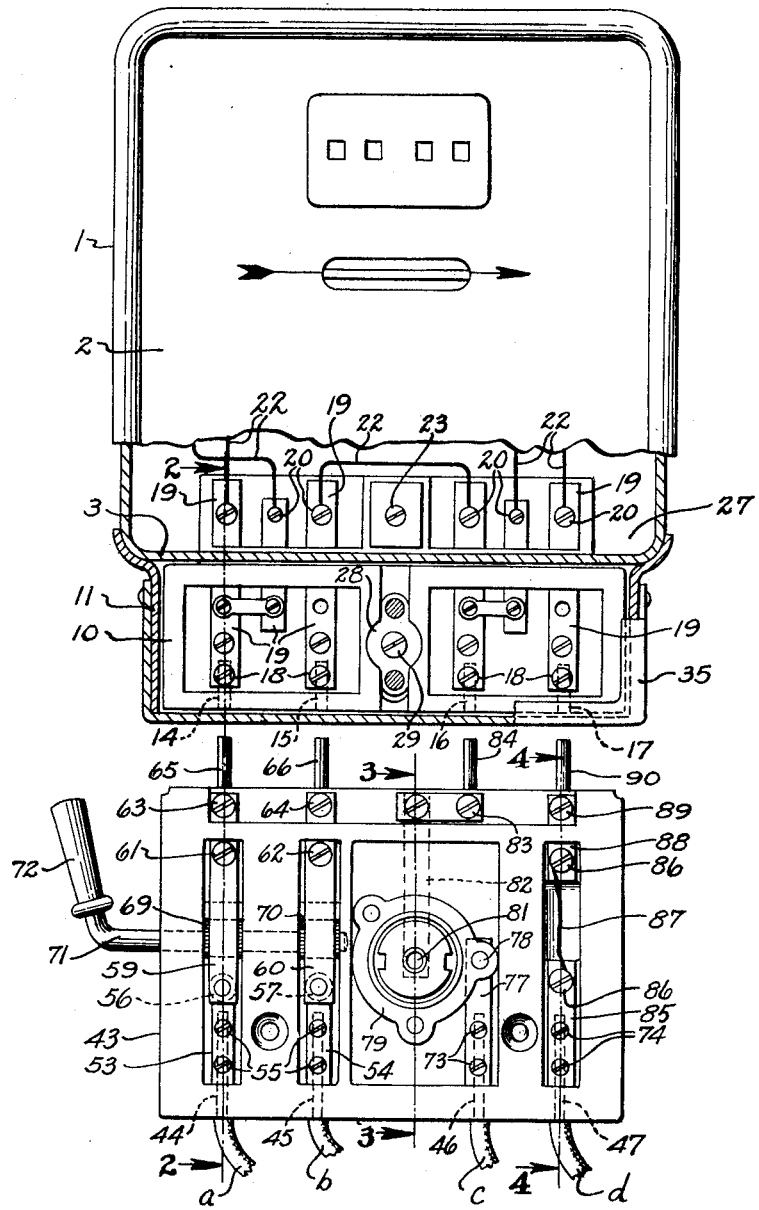
Fig. 1 is a front elevation of a mechanism embodying my invention.
Figure 2:
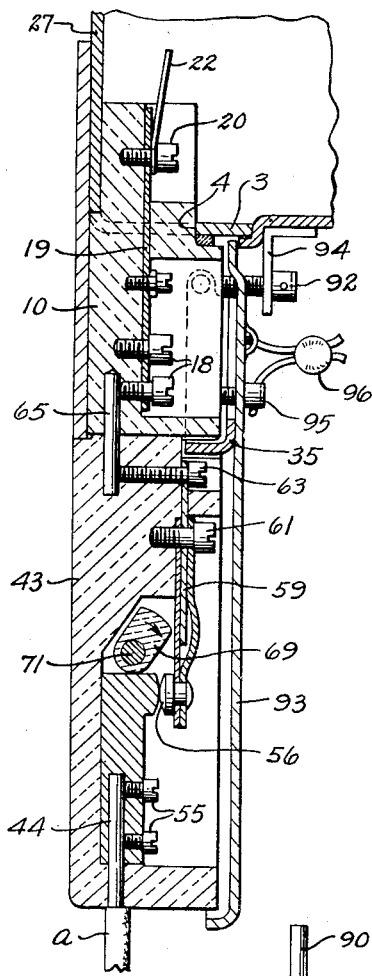
Fig. 2 is an enlarged, fragmentary section, taken on line 2—2 of Fig. 1.

Referring now in detail to the embodiment of the invention illustrated herewith by way of example, a meter casing 1 is shown having a front wall or cover 2 and a bottom wall 3. An aperture 4 is formed in the bottom part of the meter casing, in which the terminal chamber or block fits nicely, and through which it projects into the meter casing (Figs. 1 and 2). The terminal block is mounted within a suitable casing 11, which may be of any known or other suitable form and need not be described in detail. The casing 11 is usually permanently attached to or is integral with and is, in effect, a part of, the meter casing.

The circuit connections on the terminal block or chamber 10 may be of any suitable or desired form so far as concerns the present invention, and will be described only in a general way. As embodied, there are four openings 14, 15, 16 and 17 in the outer face of the terminal block, normally used to receive the line terminals, and these are connectible with clamping screws 18 for holding an inserted terminal. Conducting bars 19 lie in recesses in the terminal block, extend through the central portion thereof, and into recesses in the inner end of the block (Figs. 1 and 2). At the inner ends of the bars, there are binding screws 20 for connection with the meter circuit wires 22.

The terminal chamber block is fastened in place by suitable means, such as a screw 23 passing through an orifice in the interior portion of the block and threaded into the back plate 27 of the meter casing, and if desired into the bottom plate 11 of the housing 11. Fixed on the central upper face of the block is a countersunk plate 28, having a central aperture to receive a screw 29, which is used to fasten the meter in position upon its support.

Means may be provided, if desired, for protecting the exterior edges of the terminal chamber block, and as embodied, this protecting device comprises a bail-like member 35, which is preferably of sheet metal, and is angled so as to fit over the edges of the block 10 as shown in Figs. 1 and 2.

The embodied form of current controlling block or attachment, carrying the current controlling devices (such as a switch, or a fuse device, or both) and having connections for the circuit wires and the meter terminals, together with proper interlocks, comprises a block 43 of insulating material, which has at its outer face or end, a plurality of openings, shown as four in number, 44, 45, 46 and 47 to admit the terminal wires of the circuit, from the power supply and to the load. The two left-hand circuit connections in Fig. 1 lead to a switch mechanism. The wires a and b are received into socketed conducting bars 53 and 54, mounted in recesses in the block 43, having, respectively, terminal points 56 and 57, and holding the wires a and b by clamping screws 55.

Cooperating with the bars 53 and 54 are a pair of corresponding spring-pressed strips 59 and 60, movable to make and break the circuit. These strips are fastened to the block by screws 61 and 62, and connect, respectively, by screws 63 and 64, with corresponding terminal pins 65 and 66. These pins are clamped in place by screws 63 and 64. These pins project from the inner face of the block 43 in proper spaced relation to enter the sockets 14 and 15 of the terminal block of the meter. The spring switch contacts are operated by two short fingers or cams 69 and 70, fixed on a shaft 71, journaled in block 43, the shaft terminating in an exterior actuating handle 72. On turning handle 72, fingers 69 and 70 open the contacts 56 and 57, or permit them to close under the action of their respective springs.

Figure 3:
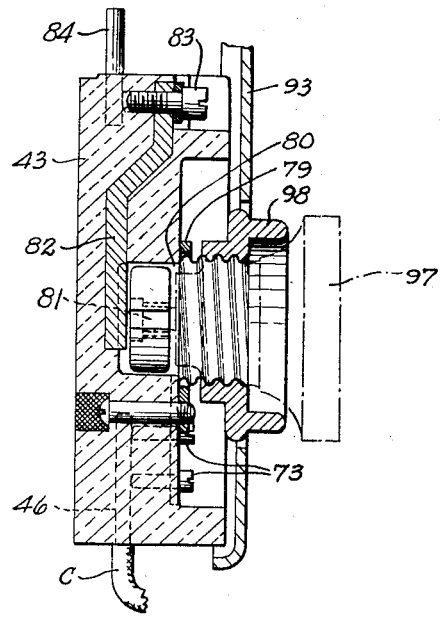
Fig. 3 is an enlarged, fragmentary section on line 3—3 of Fig. 1.
Figure 4:
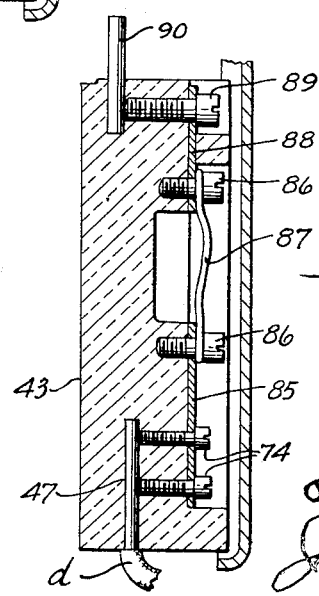
Fig. 4 is an enlarged, fragmentary section on line 4—4 of Fig. 1.

In the remaining circuit connections (Figs. 1 and 3), wires c and d are received into sockets in the block 43, and are clamped, respectively, by screws 73 and 74, which likewise make the desired circuit connections therefrom. Screws 73 pass through, and make electric connection with a conducting bar 77 positioned in a recess in the carrier block. Bar 77 at its inner end connects at 78 with a ring 79, which encircles an aperture 80 formed in the block to receive a screw plug fuse, or other current controlling or indicating device. This circuit is continued from the plug by a central contact 81 connecting to a conductor bar 82, which connects by a binding screw 83 to a projecting pin 84, adapted to enter the aperture 16 in the meter terminal block and to be clamped and electrically connected by the corresponding screw 18. The line d circuit (Figs. 1 and 4) passes through clamping screw 74, through conducting bar 78, through a fuse 87, connecting by clamping screws 86, to a short conducting bar 88, connecting by a screw 89 with a pin terminal 90, adapted to enter and make electrical connection at the aperture 17 of the meter terminal circuit.

While the control block is separate form, and in the nature of an attachment to, the meter terminal block, means are provided whereby it may be sealed in operative relation with the meter, while leaving the switch and the fuse connections accessible from without. As embodied, a flanged front cover piece 93 is adapted to fit over the front of the projecting part of the terminal block, and the front of the current control block, after the pins 65, 66, 84 and 90 have been inserted in the corresponding apertures 14, 15, 16 and 17, these pins and the flanges of the block preventing withdrawal of the control block in any direction. A retaining screw 92 is passed through a bracket 94, fixed on the meter casing, and through the retaining plate 93 and into the terminal block. A similar screw 95 is passed through the plate 93 and likewise into the terminal block, and a seal 96 may be used to prevent unauthorized opening. A screw socket 98 is fixed to carrier block 43 (Figs. 1 and 3), and projects through an opening in plate 93. A screw fuse plug 97 is screwed into the socket and makes contact with, and connection between, the ring 79 and the point 81 in the usual manner. Thus the hand switch 72 and fuse plug 97 are accessible from the exterior of the sealed current control device.

The invention in its broader aspects is not limited to the specific mechanisms shown and described, but departures may be made therefrom within the scope of the accompanying claims without departing from the principles of the invention and without sacrificing its chief advantages.

What I claim is:—

1. A current control unit for attachment to the terminal block of an existing meter, comprising a block of insulating material, a line circuit controlling switch carried by said insulating block, the upper edge of the insulating block being adapted to hold a plurality of upwardly projecting contact elements for engagement with the contacts in the terminal block of the meter, the insulating block being provided with contacts for engagement with the terminals of the line wires, and a cover plate for preventing access to the contacts of the terminal block of the meter and the said control apparatus, while permitting access to said control switch.

2. A current control unit for attachment to the terminal block of an existing meter, comprising a block of insulating material, a line circuit controlling switch carried by said insulating block, current limiting means carried by said insulating block, the upper edge of the insulating block being adapted to hold a plurality of upwardly projecting rigid contact elements, positioned to engage directly with the contacts in the terminal block of the meter when the control unit is put in operative position, the lower edge of the insulating block being provided with contacts for engagement with the terminals of the line wires, and a cover plate for preventing access to the contacts of the terminal block of the meter and the said control apparatus, while permitting access to said control switch and said current limiting means.

HERBERT NEHLS.